United States Patent

[11] 3,626,251

[72] Inventor Edward G. Vigue
Mishawaka, Ind.
[21] Appl. No. 3,706
[22] Filed Jan. 19, 1970
[45] Patented Dec. 7, 1971
[73] Assignee The Bendix Corporation

[54] AIR COOLING SYSTEM FOR CABINET MOUNTED EQUIPMENT
6 Claims, 2 Drawing Figs.

[52] U.S. Cl. ........ 317/100, 174/16 R, 165/122, 62/414
[51] Int. Cl. ........ H05k 7/20
[50] Field of Search ........ 174/15, 16; 165/122; 62/377, 427, 414, 418; 317/100

[56] References Cited

UNITED STATES PATENTS

| | | | |
|---|---|---|---|
| 2,843,806 | 7/1958 | O'Neill | 317/100 |
| 3,298,195 | 1/1967 | Raskhodoff | 174/15 X |
| 3,305,704 | 2/1967 | Battista | 317/100 |
| 3,387,648 | 6/1968 | Ward, Jr. | 317/100 X |

*Primary Examiner*—Laramie E. Askin
*Assistant Examiner*—Gerald P. Tolin
*Attorneys*—William N. Antonis and Plante, Arens, Hartz, Smith and Thompson

ABSTRACT: A cooling system for cabinet-mounted electrical equipment with a large air stream being controlled by a smaller high pressure air stream. A blower located in the bottom of the cabinet forces the main air stream upward. A smaller high pressure air stream is discharged from nozzles to direct the large air stream toward hot spots in the electrical equipment. Outlet ducts located near the electrical equipment provide a path for the large air stream to flow over the hot spots and the component parts and out of the cabinet.

INVENTOR.
EDWARD G. VIGUE
BY Plante, Arens, Hartz, Smith & Thompson
ATTORNEYS

AIR COOLING SYSTEM FOR CABINET MOUNTED EQUIPMENT

BACKGROUND AND SUMMARY

This invention relates generally to an arrangement for cooling cabinet-mounted electrical equipment and more particularly to a main air stream being controlled by a small high pressure air stream to direct the main air stream toward hot spots in the electrical equipment.

Heat is produced whenever electrical current flows through a resistive current path. The amount of heat produced in the hot spots of electric equipment (in watts) is equal to the product of the total path resistance (in ohms) and the square of the current (in amperes). Although a heating element may be essential in some operations, it proves to be quite troublesome in the applications of electronic instruments. Environmental heat may be damaging to electrical apparatus and further aggravates the operating efficiency. Heat produced must be expelled from the instrument enclosure in order to prevent improper operation and possible damage to its component parts. Although the substitution of solid state devices for vacuum tubes greatly reduces the amount of heat produced by electronic devices, heating still constitutes a significant problem to the instrument designer. POwer transistors, power transformers, loading resistors, and the like, all produce heat which must be disposed of if undesireable temperature increases are to be avoided.

The old conventional way of cooling electrical equipment was by one of two methods: (1) The utilization of a refrigeration component whereby a compressor and condenser were both necessary, or (2) forcing a large amount of air up through the equipment console. The second method was much more economical, but many times the large air stream would not be directed at the proper direction to cool particular components that use a larger portion of the power and dissipate a larger amount of heat.

Accordingly, it is a general objective of the resent invention to cool the individual component parts by directing the large air stream into the area of the hot component parts by much smaller high pressure air stream.

It is a further object of this invention to provide such cooling by utilizing the principles of fluidic controls.

It is still further object of the present invention to show how an equipment cabinet can be modified to utilize fluidic principles in directing a large air stream toward individual component parts.

These and other objects, features and advantages of the present invention will become more apparent through a consideration of the following detailed description and accompanying drawings.

DETAILED DESCRIPTION OF THE PREFERRED EMBODIMENT

Figures 1, 2:
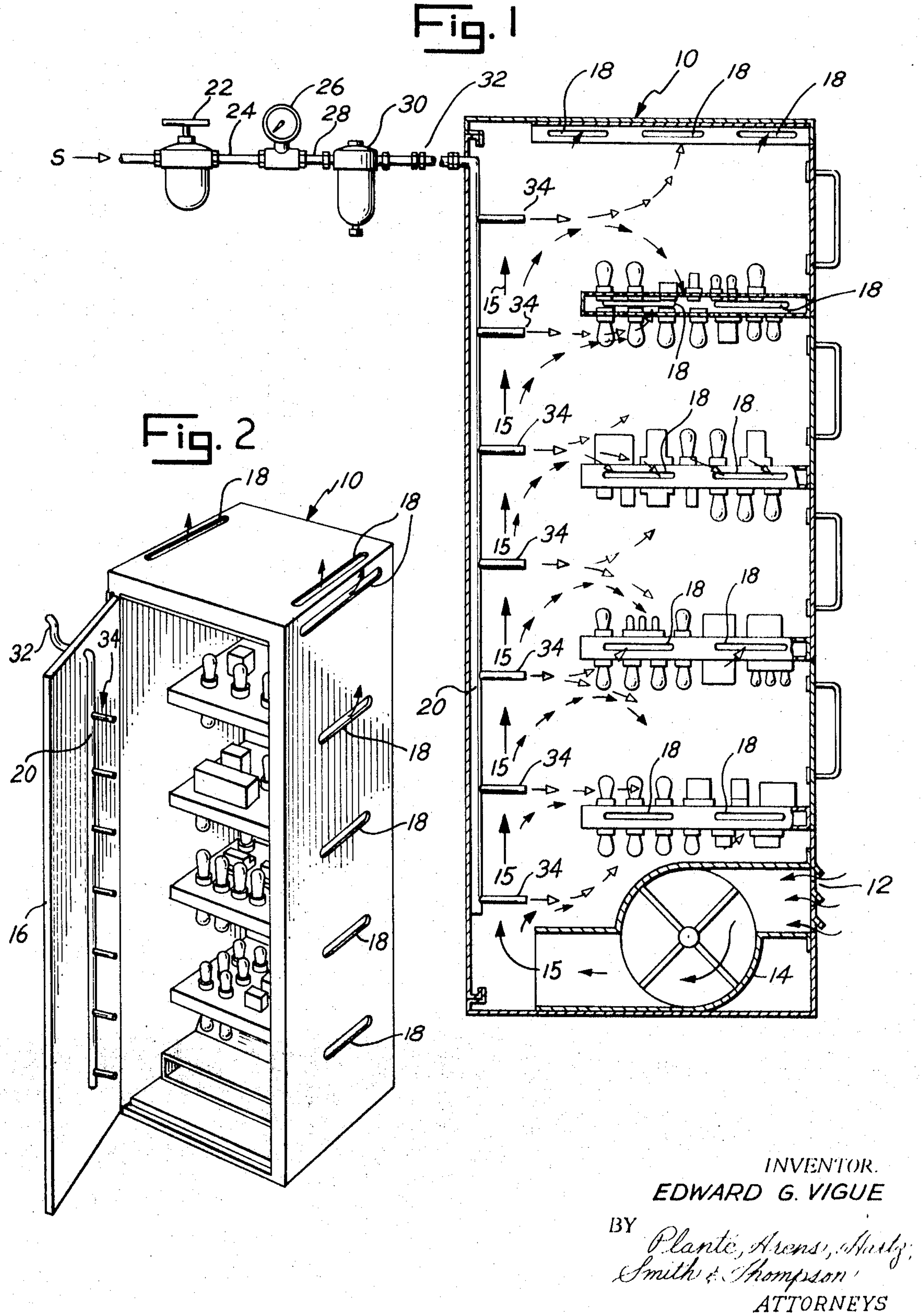
FIG. 1 is a side cross-sectional view of a cabinet with electrical equipment mounted therein and embodying the principles of the invention.
FIG. 2 is a perspective view of the rear of the equipment cabinet with the rear door open to illustrate one approach to modifying the standard equipment cabinets to accommodate the principles of the invention.

The principles of the present invention may be best illustrated by reference to the attached drawing which shows two views of a cabinet for mounting electrical equipment, the cabinet embodying the present invention. In FIG. 1, the cabinet represented generally by reference numeral 10 contains inlet ducts 12 and a blower 14 both located in the lower portion of the cabinet 10. The blower 14 will force a large air stream upward along the rear door 16 of the cabinet as shown by the arrows 15 in FIG. 1. The large air stream will exit through outlet ducts 18 in the side or in the top of the cabinet 10. These outlet ducts can be located anywhere in the cabinet to provide a maximum flow across the hot component parts.

Mounted on the rear door 16 of the cabinet 10 is a conduit 20 that connects to a source S of control pressurized air. The flow of pressurized air into the cabinet 10 is controlled by a control valve 22. The control valve 22 is connected through an interconnection conduit 24 to a pressure indicator 26. From the pressure indicator 26, another interconnection conduit 28 connects the pressure indicator 26 to a filter 30. Filter 30 connects to a quick disconnect 32 whereby high pressure air source S is connected to conduit 20. By using control valve 22 and the quick disconnect 32 the cabinet may be disconnected from the high pressure air source S with a minimum amount of trouble. The high pressure air source S flows down the conduit 20 to the outlet nozzles 34. The outlet nozzles 34 are arranged to discharge high pressure air in an approximately horizontal manner. The high pressure, low volume air stream (control air stream) will control the direction of flow of the low pressure, high volume air stream (main air stream). The main air stream is indicated by arrows with open arrowheads.

The nozzles 34 are selectively located so that the small, high pressure air stream will direct the main air stream toward the hot component parts in the electrical equipment that is mounted in the cabinet 10. NOtice that the main air stream blows upward along the rearward portion or door 16 of the cabinet 10. UPon impingement with the small, high pressure air stream, the main air stream is directed toward particular component parts within the cabinet console 10. After flowing over these particular component parts, the main air stream exits through outlet ducts 18 located near the particular component part. The nozzles 34 and outlet ducts 18 should be so located that the major portion of the large air stream will flow over the hotter component parts of the electrical equipment. By using this simple principle of fluidics, a smaller air stream is being used to control a much larger air stream whereby a maximum cooling efficiency can be obtained.

The filtering elements needed in the air streams depends upon the individual needs. Normally, in the high pressure air system a filter 30 would be necessary to keep from clogging the nozzles 34. However, the large air stream that is forced through the cabinet 10 by the blower 14 may be filtered by having a wire screen mesh located over the inlet ducts 12. Also the quick disconnect 32 could be replaced with a flexible hose (shown in FIG. 2) whereby the rear door 16 of the cabinet 10 could be opened at any time without having to disconnect the high pressure air source S. The method of attaching the conduit 20 to the rear door 16 may be by any convenient means such as brackets, welding, clamps, etc. The equipment that is contained within the cabinet 10 may be slidably mounted, bolted to the face of the cabinet, contained in trays, or any other convenient means. It is to be understood that there are many ways of arranging the nozzles 34, whereby the small, high pressure air stream would control the main air stream. The only requirement for the location of the outlet ducts 18 is to direct the general flow of the main air stream over the particular hot component part. No requirement is necessary that the outlet ducts 18 be located along the side of the cabinet 10 or in the upper portions of the cabinet 10.

In a cabinet similar to the one shown in FIGS. 1 and 2 a series of tests have been performed. With the small air stream being operated at a pressure of 10 p.s.i., a reduction of 25 percent in the Fahrenheit temperature was realized. By increasing the pressure to 15 p.s.i., another slight reduction was realized. By further increasing the pressure to 20 p.s.i., almost no change was realized. Therefore, for a pressure of approximately 10 p.s.i. being applied to the small air stream the best cooling conditions can be realized. In cubic feet per minute, a blower located in the bottom of the cabinet forces approximately 20 times the amount of air through the cabinet as the small air stream.

The specific embodiment of this invention is merely illustrative of one application of the many fluidic principles that could be applied with this invention. Numerous other applications may be devised by those skilled in the art without departing from the true spirit and scope of the invention.

I claim:

1. A cooling apparatus in combination with a cabinet containing a plurality of operating electrical components generating varying amounts of heat in different areas of the cabinet, said cooling apparatus maintaining each of the electrical components within a predetermined temperature range, said cooling apparatus comprising:

intake means in said cabinet and connected to a first source of fluid, said intake means moving fluid from said first source in a first flow path through said cabinet to uniformly cool said operating electrical components;

control means connected to a second source of fluid under pressure having outlets strategically located within said cabinet, fluid from aid second source intercepting the first flow path of the fluid from said first source causing a portion of the first fluid to be displaced in a second flow path toward a selected member of said operating electrical components to provide additional cooling in those areas;

exhaust means selectively located in said cabinet to provide an outlet for the first fluid in the second flow path to remove the heat generated by the selected electrical components without affecting the operation of the other electrical components located within the cabinet.

2. The cooling apparatus as recited in claim 1 wherein aid control means includes:

regulation means for limiting the amount of said second fluid flowing through said outlets into the cabinet.

3. The cooling apparatus as recited in claim 2, wherein:

said regulation mans comprises valve means, pressure indicator means and filter means inserted between said source of pressurized air and said outlet means; and said outlets are nozzles for ejecting said pressurized air in an approximately horizontal direction.

4. The cooling apparatus as recited in claim 3 wherein:

said intake means comprises a blower means for forcing the first fluid through inlet ducts into said cabinet; and said exhaust means comprise exhaust ducts selectively located in said cabinet for providing an exit for the first and second fluids.

5. A system for cooling electrical equipment comprising:

a cabinet having inlet and outlet ducts, electrical equipment being mounted within said cabinet, some of said electrical equipment when operating producing hotter areas than the remaining electrical equipment; p1 blower means connected to said inlet ducts for bringing air into said cabinet and for forcing a large stream of air through the cabinet and outsaid outlet ducts;

a conduit mounted in aid cabinet; a source of pressurized air connected to said conduit;

nozzle means selectively attached to aid conduit for directing said pressurized air into said stream of air causing a portion of said stream of air to impinge upon and cool said hotter areas of said operating electrical equipment; and outlet means located relatively close to said hotter areas for removing the directed portion of said air stream that has cooled said hotter area from said cabinet without affecting the operation of said remaining electrical equipment.

6. A system for cooling electrical equipment as recited in claim 5, further comprising:

a regulator valve, pressure indicator, and filter connected between aid source of pressurized air and said conduit; and a quick disconnect in said conduit for detaching said cabinet from said source of pressurized air.

* * * * *